2 Sheets—Sheet 1.

J. THOMSON.
CHECK-ROWER.

No. 169,865.  Patented Nov. 9, 1875.

WITNESSES
Franck L. Durand
C. L. Evert

INVENTOR
John Thomson.
By Alexander Mason
Attorney

J. THOMSON.
CHECK-ROWER.
No. 169,865.
Patented Nov. 9, 1875.
2 Sheets—Sheet 2.
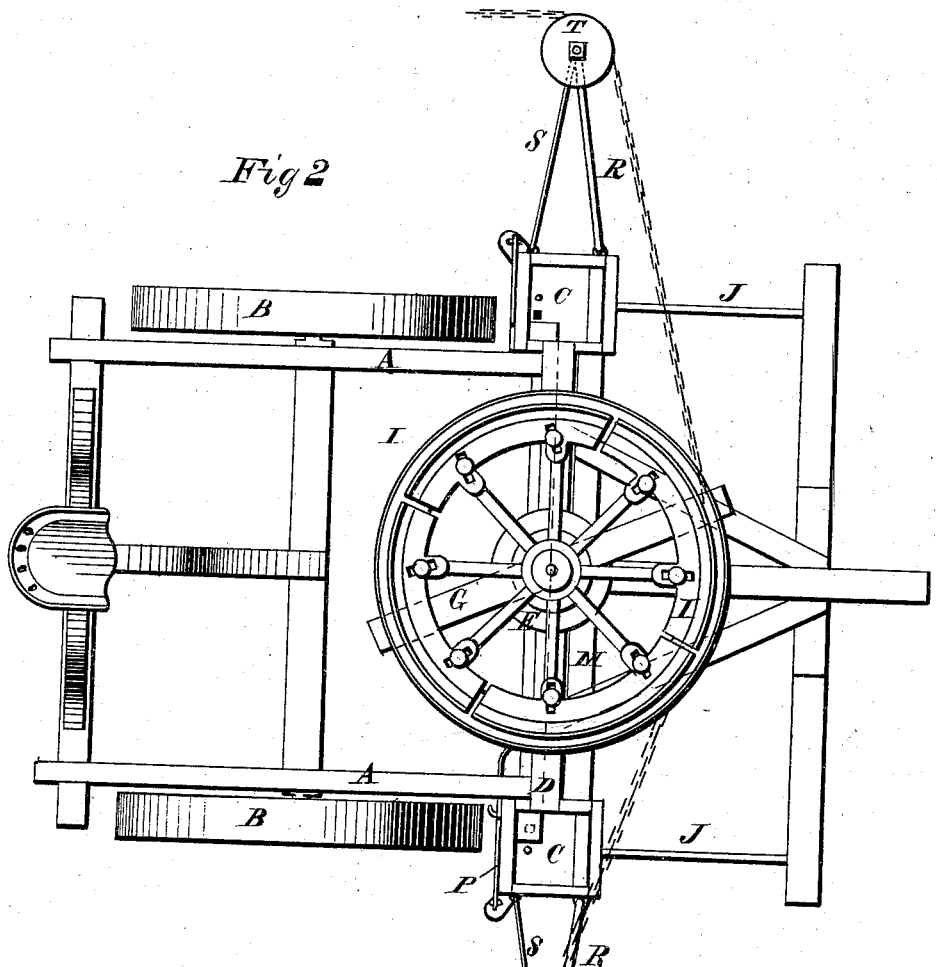
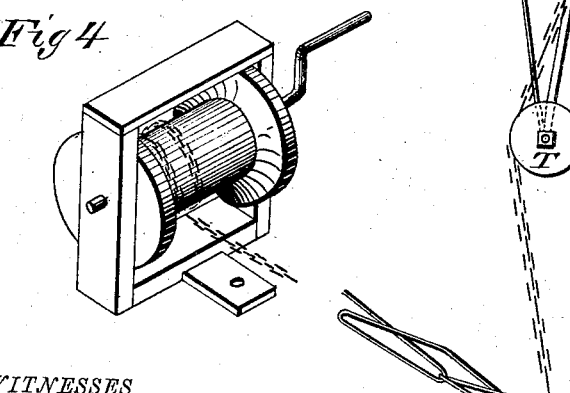

UNITED STATES PATENT OFFICE.

JOHN THOMSON, OF ALEDO, ILLINOIS.

IMPROVEMENT IN CHECK-ROWERS.

Specification forming part of Letters Patent No. 169,865, dated November 9, 1875; application filed September 11, 1875.

*To all whom it may concern:*

Be it known that I, JOHN THOMSON, of Aledo, in the county of Mercer and in the State of Illinois, have invented certain new and useful Improvements in Check-Rowers; and do hereby declare that the following is a full, clear, and exact description thereof, reference being had to the accompanying drawings, and to the letters of reference marked thereon, making a part of this specification.

The nature of my invention consists in the construction and arrangement of certain devices supported upon a wheeled frame, for the purpose of check-rowing land and planting grain, the peculiarities of which will be hereinafter more fully set forth.

Figure 1:
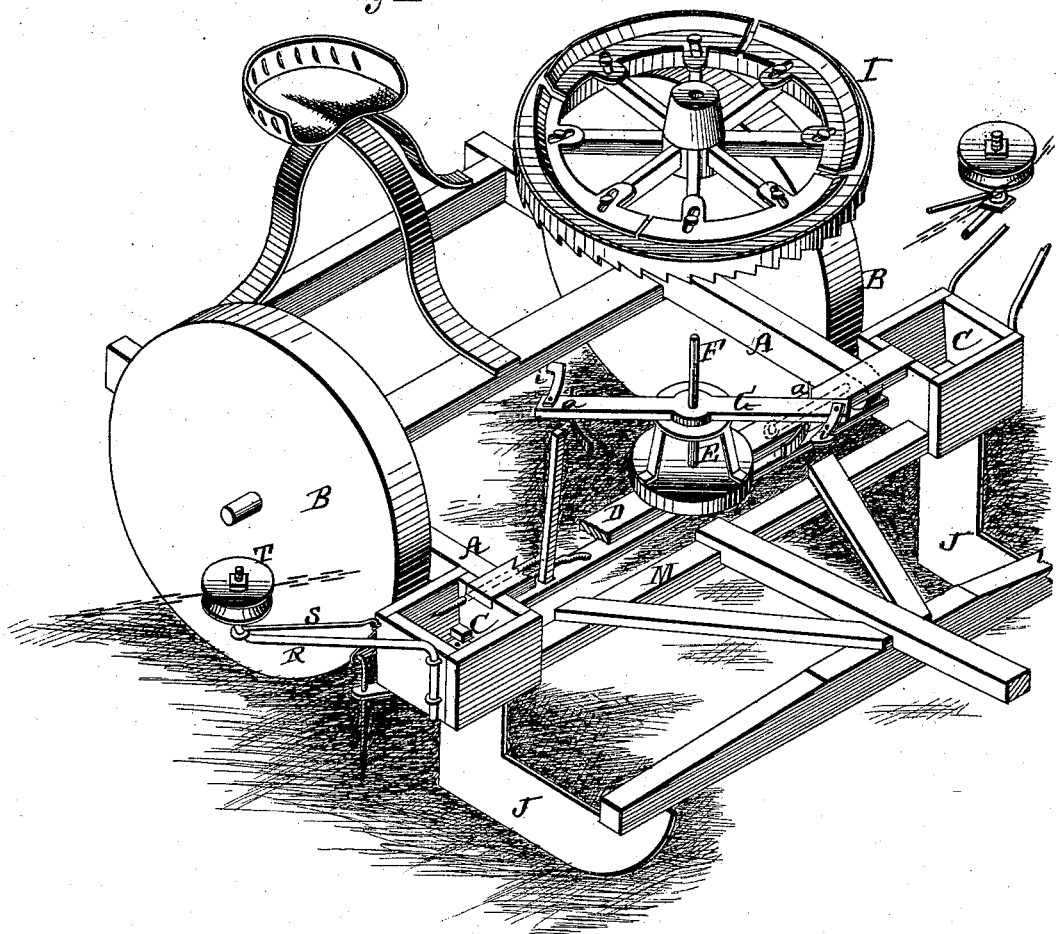
Figure 3:
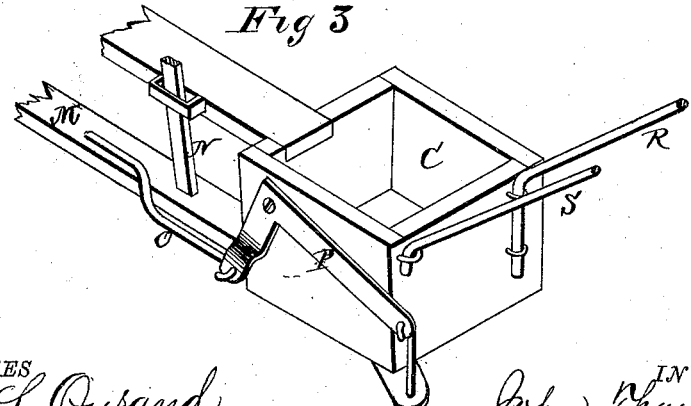

In the annexed drawings, making part of this specification, Figure 1 represents a perspective of my machine, with the extension-wheel removed from its shaft and placed on one side. Fig. 2 is a plan view; Fig. 3, a perspective of the seed-box, seed-slide, and marker; and Fig. 4 is a view of the reel which contains the chain or cord used.

In the figures, A represents the frame of the machine, which is made in any known way, and supported upon the wheels B B. J J represent the usual runners, secured to the forward part of the frame. C C represent the seed-hoppers, which are placed on the frame immediately in front of the wheels B, said wheels acting as coverers of the grain.

Upon a cross-bar, D, of the frame is secured a kind of stationary hub, E, which has passing through it a stationary vertical axle or post, F.

G represents a bar, which has a hole through its center. This bar is passed over the shaft F, and revolves around it. The wheel I has a hub, which also passes over the shaft F, and rests upon the bar G. This bar G is provided upon its under side, near each end, with two rim-cams, *a a*, and upon its upper side with two spring-pawls, *i i*, near each end. These pawls catch into ratchet-teeth on the under side of the wheel I, and prevent the bar G from turning in but one direction, and allow it to be adjusted at any point to bring the hills into correct line.

M represents the seed-slide, which is provided with a vertical bar, N. This bar projects upward far enough to be operated upon by the rim-cams *a a* on the wheel I. One of said cams strikes this bar N upon one side and moves it in one direction, while the other cam strikes it on the other side and moves it in the opposite direction, thus carrying the seed out of the hoppers. A bar, O, connects the seed-slide to an elbow-lever, P, and this lever P has connected to its other end a marker, Q, which rises and falls vertically at each motion of the slide.

R R represent flexible metallic rods, which are secured to the outer ends of the seed-boxes, and which are braced by the braces S S. On the outer ends of the rods R R are placed the pulleys T T.

The wheel I is so constructed, as seen, with sliding auxiliary pulleys, that it can be enlarged, or made to change its diameter or circumference, by shifting these sections in or out.

This machine is made to do its check-rowing by means of a flexible chain or cord. One end of this cord is staked at one side of the field to be planted. The machine is then driven to the other side of the field, carrying the reel seen in Fig. 4, and paying out the cord. The machine being turned to commence work, the cord is passed over one pulley, and then once around the wheel I, then around the other pulley, and then staked in the ground. The machine runs close to the cord across the field. When it moves, the wheel I and the bar G revolve, and the cams *a a*, operating on the seed-slides and upon the markers, not only distribute the grain, but mark where it is deposited.

When the machine has reached the other side of the field, it is turned around, the cord is removed and shifted, and again passed around the pulleys and the expansion-wheel, the markers being made to commence work on line with where they left off, so that the check-rows will always correspond.

Having thus fully described my invention, what I claim as new, and desire to secure by Letters Patent, is—

The wheel I, having the ratchet-teeth, in combination with the bar G, having cams *a a* and pawls *i*, all constructed to operate substantially as and for the purposes set forth.

In testimony that I claim the foregoing I have hereunto set my hand this 4th day of August, 1875.

JOHN THOMSON.

Witnesses:
ALEX. MCARTHUR,
T. B. TURNBULL.